(12) United States Patent
Ba et al.

(10) Patent No.: US 11,379,766 B2
(45) Date of Patent: Jul. 5, 2022

(54) SENSOR DEPLOYMENT

(71) Applicant: International Business Machines Corporation, Armonk, NY (US)

(72) Inventors: Yutao Ba, Beijing (CN); Wenchen Cheng, Beijing (CN); Xin Jie Lv, Beijing (CN); Lingyun Wang, Beijing (CN); Ming Xie, Beijing (CN); Wen Jun Yin, Beijing (CN); Gang Zhou, Beijing (CN); Ke Xu Zou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 864 days.

(21) Appl. No.: 15/437,947

(22) Filed: Feb. 21, 2017

(65) Prior Publication Data
US 2018/0240057 A1  Aug. 23, 2018

(51) Int. Cl.
*G06Q 10/06* (2012.01)
*G01S 17/95* (2006.01)

(52) U.S. Cl.
CPC ........ *G06Q 10/06313* (2013.01); *G01S 17/95* (2013.01)

(58) Field of Classification Search
CPC .............................................. G06Q 10/06313
USPC ....................................................... 705/7.23
See application file for complete search history.

(56) References Cited

U.S. PATENT DOCUMENTS 6,804,600 B1 * 10/2004 Uluyol ..................... G05B 9/02
123/479
2006/0253570 A1 * 11/2006 Biswas ............... H04L 41/0816
709/224
2013/0035870 A1 * 2/2013 Feng ................... G01N 33/0075
702/24
2016/0125307 A1 * 5/2016 Zheng .................... G06N 7/005
706/20
2016/0370333 A1 * 12/2016 Li ....................... G01N 33/0004
(Continued)

FOREIGN PATENT DOCUMENTS

CN          202720001 U      2/2013
CN          105181898 A     12/2015
(Continued)

OTHER PUBLICATIONS

Perry K. Davy, Travis Ancelet, William J, Trampetter, Andreas Markwitz, David C. Weatherburn, Composition and source contributions of air particulate matter pollution in a New Zealand suburban town, Aug. 10, 2011, Atmospheric Pollution Research 3 (2012), pp. 143-147 (Year: 2012).*
(Continued)

*Primary Examiner* — Brian M Epstein
*Assistant Examiner* — Kristin E Gavin
(74) *Attorney, Agent, or Firm* — Joseph Petrokaitis; Ryan, Mason & Lewis, LLP

(57) ABSTRACT

At least one target area is identified based on a pollution concentration field of a geographic area. At least one candidate site is selected from a plurality of sites within the geographic area based on a relationship between the plurality of sites and pollution sources, where the plurality of sites are potential positions for deploying sensors for monitoring pollution. A target site is determined from the at least one candidate site based on the at least one target area.

20 Claims, 7 Drawing Sheets

(56) References Cited

U.S. PATENT DOCUMENTS

2017/0127220 A1* 5/2017 Rosti .................... H04L 65/608
2017/0168487 A1* 6/2017 Mantripragada ...... G05D 1/104

FOREIGN PATENT DOCUMENTS

WO        2014164547 A1    10/2014
WO   WO-2017115053 A1 *  7/2017  ......... G01N 33/0004

OTHER PUBLICATIONS

Perry K. Davy, Travis Ancelet, William J. Trampeeter, Andrea Markwitz, David C. Weatherburn, "Composition and source contributions of air particulate matter pollution in a New Zealand suburban town", Aug. 10, 2011, Atmospheric Pollution Research 3 (2012), pp. 143-147 (Year: 2012).*

Davy, Perry K. Composition and source contributions of air particulate matter pollution in a New Zealand suburban town, 2012, Atmospheric Pollution Research 3 (2012) 143-147 (Year: 2012).*

English translation for China Application No. CN105181898A.

English translation for China Application No. CN202720001U.

A. Boubrima et al., "Cost-Precision Tradeoffs in 3D Air Pollution Mapping Using WSN," The Second International Symposium on Ubiquitous Networking (UNET), May 2016, pp. 191-203, Casablanca, Morocco.

A. Boubrima et al., "Optimal Deployment of Wireless Sensor Networks for Air Pollution Monitoring," IEEE 24th International Conference on Computer Communication and Networks (ICCCN), Aug. 3-6, 2015, pp. 1-7.

* cited by examiner

SENSOR DEPLOYMENT

BACKGROUND

With the development of real-time monitoring and data processing technology, environment monitoring has become an important aspect of people's daily life. Building a monitoring station requires a large investment in the purchase of sensor equipment, housing construction and other expenses. In order to more fully and accurately detect the environment parameters in a geographic area, it is usually necessary to set up a large number of monitoring stations in the geographic area. Therefore, determining the number of monitoring stations and deployment positions for the monitoring stations within the geographic area has become a current research focus.

SUMMARY

In one embodiment, a computer-implemented method is provided. According to the method, at least one target area is identified based on a pollution concentration field of a geographic area. At least one candidate site is selected from a plurality of sites within the geographic area based on a relationship between the plurality of sites and pollution sources, where the plurality of sites are potential positions for deploying sensors for monitoring pollution. A target site is determined from the at least one candidate site based on the at least one target area. The steps of the method are performed by at least one processing device comprising a processor operatively coupled to a memory.

In another embodiment, a system is provided. The system comprises at least one processing device comprising a processor operatively coupled to a memory. The at least one processing device is configured to identify at least one target area is identified based on a pollution concentration field of a geographic area. At least one candidate site is selected from a plurality of sites within the geographic area based on a relationship between the plurality of sites and pollution sources, where the plurality of sites are potential positions for deploying sensors for monitoring pollution. A target site is determined from the at least one candidate site based on the at least one target area.

In yet another embodiment, a computer program product is provided. The computer program product comprises a processor-readable storage medium for storing processor-readable program code which, when executed by a processor, causes the processor to: identify at least one target area based on a pollution concentration field of a geographic area; select at least one candidate site from a plurality of sites within the geographic area based on a relationship between the plurality of sites and pollution sources, where the plurality of sites are potential positions for deploying sensors for monitoring pollution; and determine a target site from the at least one candidate site based on the at least one target area.

It is to be understood that the summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, same or similar reference numerals represent the same or similar elements.

DETAILED DESCRIPTION

Principles of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

As used herein, the term "includes" and its variants are to be read as opened terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
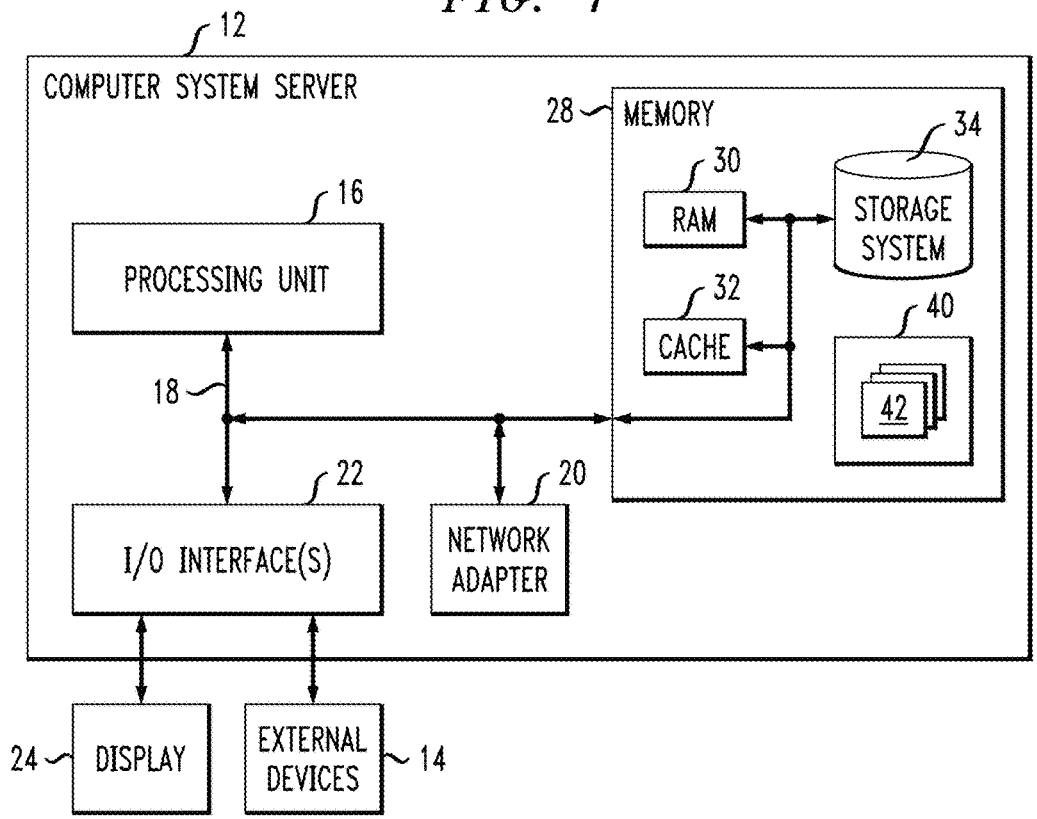
FIG. 1 schematically illustrates an example computer system/server 12 which is applicable to implement one or more embodiments.

One or more embodiments can make use of software running on a computer or workstation. With reference to FIG. 1, an exemplary computer system/server 12 that is applicable to implement the embodiments of the present disclosure is shown. Computer system/server 12 is only illustrative and is not intended to suggest any limitation as to the scope of use or functionality of embodiments of the disclosure described herein.

Computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 is shown in the form of a computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

It is appreciated that the computer system/server 12 as illustrated in FIG. 1 is only an example of the computing device in which the embodiments of the present disclosure may be implemented. In one embodiment, the data nodes in the distributed processing system and the distributed storage system may have similar configuration of the computer system/server 12.

Figure 2:
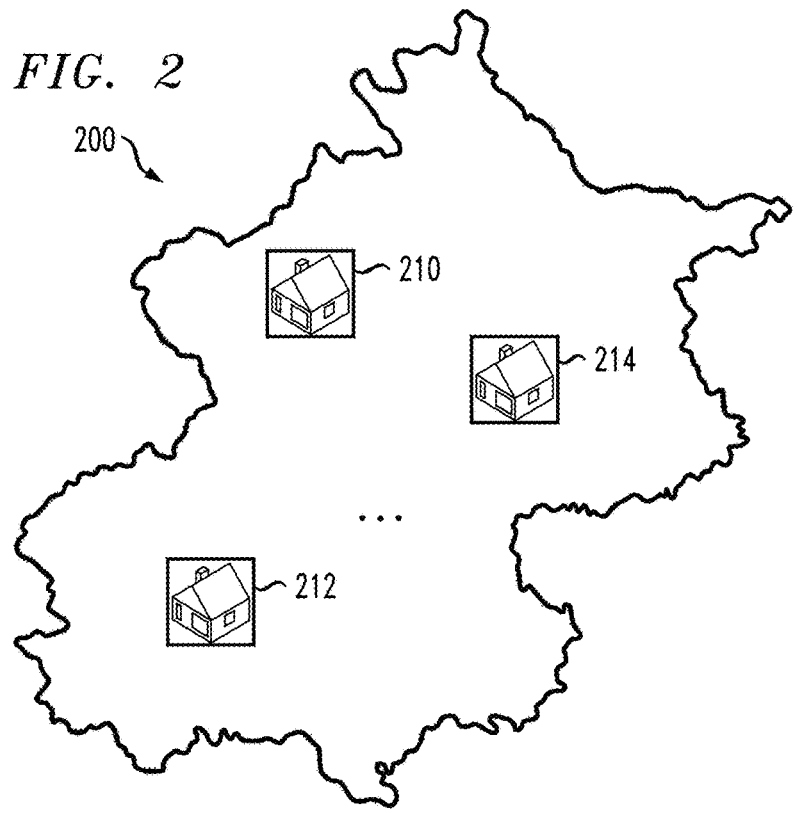
FIG. 2 schematically illustrates an example diagram block of an environment monitoring system according to one embodiment.

FIG. 2 schematically illustrates an example diagram block of a typical environment monitoring system 200 according to an embodiment. As illustrated in FIG. 2, the environment monitoring system 200 comprises a plurality of monitoring stations 210, 212, . . . , and 214. Usually, the environment may change with the development of the region. For example, a new factory may be built and the factory emissions may change the pollution concentration of the region. One or more monitoring stations may be built near the factory so as to improve the accuracy of the monitored parameters. Setting up a monitoring station generally requires a large investment, including building a structure for housing the monitoring station, buying monitoring devices, creating a communication network, and the like. Accordingly, it is desirable to minimize the number of new stations to be placed into the system 200 so as to reduce the cost.

Some approaches have been proposed for determining the location of the monitoring station. In one such approach, the location may be determined based on predetermined rules and expert experience. This approach, however, is based on the accumulation of historical experience and heavily relies on the expert's personal judgment, which may possibly result in a misjudgment of the location, and may thus lead to a sensor deployment that cannot effectively monitor the representative environment parameters in the region. In another such approach, a method is presented for determining where to set up a new monitoring station based on statistical data analysis. However, this approach relies heavily on historical statistical data throughout the region and thus cannot be applied to new regions that do not have historical statistics (e.g., new cities).

With the above approaches, although the positions of the monitoring stations may be determined, the determined positions may not be accurate enough for providing representative environment parameters. Accordingly, it is desirable to provide a technical solution that can improve the deployment of sensors in the existing environment monitoring system. Further, it is expected to improve the accuracy of the environment monitoring system and to obtain representative environment data that reflects the characteristics of the area at a lower cost.

In view of the above, one embodiment of the present disclosure proposes a computer-implemented method. In the method, at least one target area is identified based on a pollution concentration field of a geographic area. At least one candidate site is selected from a plurality of sites within the geographic area based on a relationship between the plurality of sites and pollution sources, where the plurality of sites are potential positions for deploying sensors for monitoring pollution. Next, a target site is determined from the at least one candidate site based on the at least one target area.

In the embodiment of the present disclosure, a target site may be determined based on the pollution concentration field of the geographic area that is to be monitored, where a sensor may be deployed at the target site. In this embodiment, the pollution concentration field may be associated to the air pollution. In this embodiment, the sensor that is to be deployed at the target site may be simple small-scale equipment for collecting the pollution data instead of precise large-scale equipment for the traditional monitoring station. With the technical solution proposed in the present disclosure, as the cost for buying and deploying a sensor may be greatly reduced, a plurality of sensors (e.g., hundreds of sensors) may be deployed within the geographic area for collecting the pollution data.

It is appreciated that the air pollutants may comprise various types. For example, the air pollutants may comprise one or more of PM 2.5, PM 10, sulfur dioxide, nitrogen oxide, carbonic oxide, ozone, and the like. However, this list should not be considered as limiting. In the context of the present disclosure, the embodiments are described by monitoring the PM 2.5 as examples. However, those skilled in the art may modify the teachings of the illustrative embodiments to monitor another type of pollutant, and determine another target site for deploying another type of sensors.

Figure 3:
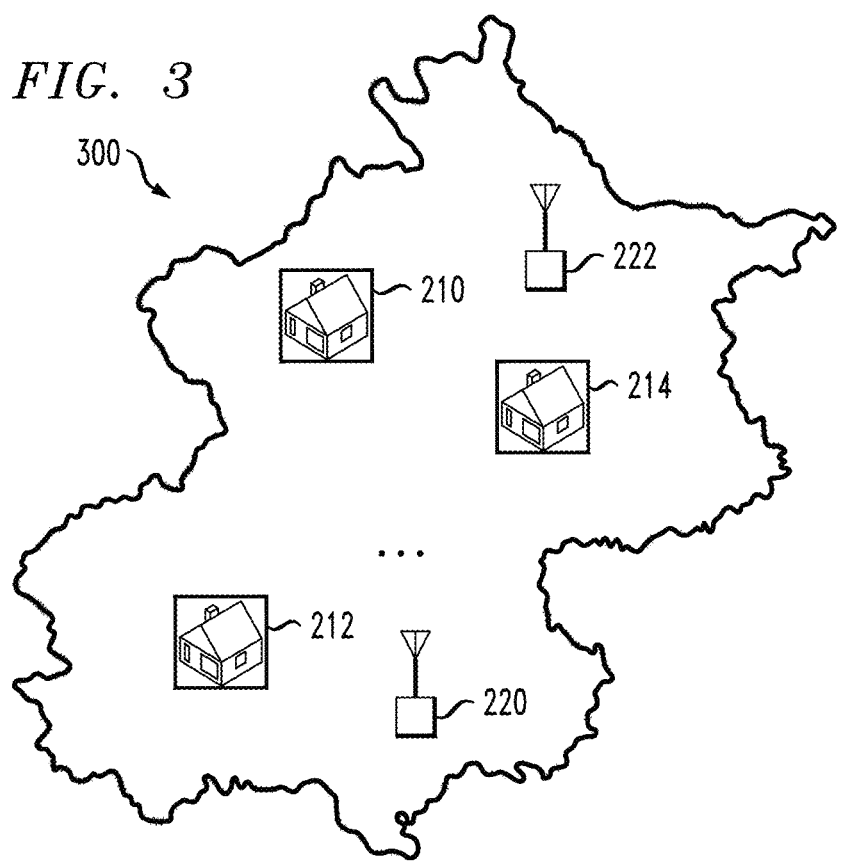
FIG. 3 schematically illustrates an example diagram block of the monitoring system according to one embodiment.

FIG. 3 schematically illustrates an example diagram block 300 of the monitoring system according to one embodiment of the present disclosure. Once a target site is determined according to the embodiment of the present disclosure, a sensor may be deployed at the target site. As illustrated in this figure, the reference numbers 220 and 222 may indicate sensors deployed at the target sites determined according to the embodiments of the present disclosure. The present disclosure does not limit the types of the sensors 220 and 222. In one embodiment, the sensors 220 and 222 may be PM 2.5 monitors, and the position for deploying the sensors 220 and 222 may be determined based on the pollution concentration field and the pollution sources associated with PM 2.5. In another embodiment, the sensors 220 and 222 may be a PM 2.5 monitor and a sulfur dioxide monitor. In this embodiment, the position for deploying the sensor 220 may be determined based on the pollution concentration field and the pollution sources associated with PM 2.5, and the position for deploying the sensor 222 may be determined based on the pollution concentration field and the pollution sources associated with the sulfur dioxide.

Figure 4:
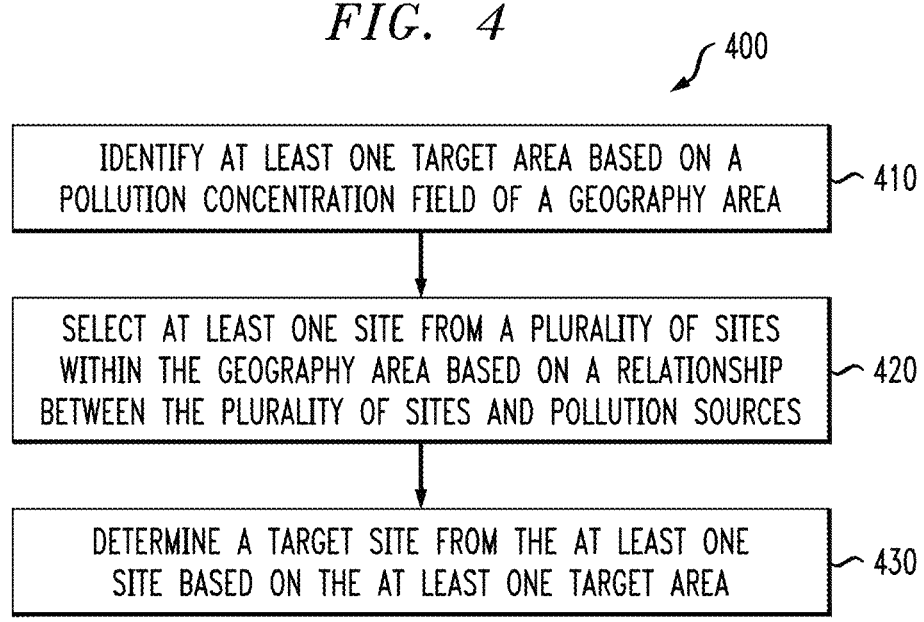
FIG. 4 schematically illustrates an example flowchart of a method for determining a position for deploying a sensor according to one embodiment.

FIG. 4 schematically illustrates an example flowchart 400 of a method for determining a position for deploying a sensor according to one embodiment of the present disclosure. At step 410, at least one target area is identified based on a pollution concentration field of a geographic area. In one embodiment, the pollution concentration field may be a model describing the distributions of one or more pollutants in the air within the geographic area. The geographic area may be a city, a district, etc. For example, at least one target area may be identified based on a pollution concentration field of Beijing.

At step 420, at least one candidate site is selected from a plurality of sites within the geographic area based on a relationship between the plurality of sites and pollution sources, where the plurality of sites are potential positions for deploying sensors for monitoring pollution. There may be several pollution sources within the geographic area. For example, pollution sources may include factories, transportation hubs, and the like. Further, there may be a plurality of candidate sites at which sensors may be deployed in the geographic area. Usually, a sensor located at a candidate site near the pollution sources may precisely monitor the pollution emission from the source, and thus the relationship between the plurality of candidate sites and the pollution sources may be considered at step 420. Several aspects may be used in determining the relationship. Such aspects may include, for example, the distance between the site and the pollution source(s) and the weather situation.

The candidate sites are predefined positions at which sensors may be deployed. It is appreciated that the candidate sites are not limited to be located on the ground, and may be located at an above-ground position. For example, the candidate site may be located on the top of a building, on the top of a TV tower, or at another place within the geographic area. Although FIG. 4 illustrates the steps 410 and 420 in a successive order, the two steps may be implemented in parallel or in a reversed order.

At step 430, a target site is determined from the at least one candidate site based on the at least one target area. The position of the target site may be related to two aspects: (1) the area of interest within the geographic area, for example, the heavily polluted area(s) in the city; and (2) the position constraint for deploying the sensor. In one example, if it is determined that a particular area is a heavily polluted area in the city, but there is no candidate site at the particular area for deploying a sensor, then no sensor can be deployed within the particular area.

The at least one target area determined at step 410 and the at least one candidate site selected at step 420 may be used in determining the target site. Based on the above two aspects, a target site that may cover the at least one target area as much as possible.

In one embodiment, the pollution concentration field is a 3D model that describes the pollutant distribution among a 3D space. The pollution concentration field may be obtained from a third party, such as the bureau of meteorology or another organization, providing air quality monitoring and forecasting data. Besides varying over time, the obtained pollution concentration field may be further affected by other factors. The obtained pollution concentration field may be corrected by measurement data collected recently in some embodiments of the present disclosure.

In one embodiment, an initial field may be obtained from an air quality model of the geographic area. The pollution concentration field may then be determined by correcting the initial field with measurement data, where the measurement data is collected by at least one sensor located within the geographic area. In this embodiment, the air quality model of the geographic area may be obtained freely or commercially. Then, an initial field may be determined from the air quality model based on approaches that have been proposed or to be developed in the future. As the air quality model is related to time, the initial field may be an estimation of the pollution concentration by running the air quality model. The real-time pollution concentration may vary over time under different weather situations. Measurement data collected in real time or near real time may be used to correct the deviation of the estimation from the actual situation.

In one embodiment, the sensor may be a laser sensor (such as a laser radar or other types of laser device) for determining the reflectivity of the air. For example, the laser sensor may be a type of laser equipment used in the meteorological monitoring and other fields, and the laser sensor that is deployed in the geographic area may collect the reflectivity data. Continuing the above example for deploying a sensor in Beijing, there may be tens of laser sensors deployed in Beijing, and thus the measurement data collected in real time or near real time by these laser sensors may be used for correcting the initial field.

The measurement data may indicate the pollution level within in a certain range around the position of the laser sensor. For example, the measurement data collected by a laser sensor may be used for correcting the data values associated with the certain range around the position in the initial field. Further, the initial field shows an overall estimation of the pollution concentration, and the data values in the initial field may be used for those points that are far away from the position of the laser sensor. Descriptions about correcting the initial field with the measurement data collected by one laser sensor will be provided hereinafter.

In one embodiment, with respect to one of the at least one sensor, measurement data collected by the sensor may be converted into a sequence of concentration values associated with height values. A magnitude at a point associated with a position of the sensor may be generated by combining values associated with the position in the initial field and the sequence of the concentration values, and then the initial field may be updated with the generated magnitudes.

In the above embodiment, both of the measurement data collected by the sensor and the values in the initial field are used. During the operation of the laser sensor, the laser sensor emits the laser beam and collects the reflection signal as the measurement data. The lower the height is, the more accurate the measurement data is. Accordingly, in determining the values for a lower height, the measurement data may be given a greater weight and the data in the initial field may be given a lower weight. Meanwhile, in determining the values for a greater height, the measurement data may be given a lower weight and the data in the initial field may be given a greater weight. In one embodiment, the magnitude may be determined based on the Equation 1 as below:

$$\text{magnitude}(t,x,y,h) = \alpha \cdot \text{laser}(t,x,y,h) + \beta \cdot \text{initial}(t,x,y,h) \qquad 1.$$

Where magnitude(t, x, y, h) indicates the concentration value at the position (x, y, h) at the time point oft; laser(t, x, y, h) indicates the concentration value determined from the laser measurement data at the position (x, y, h) at the time point oft; and initial(t, x, y, h) indicates the concentration value determined from the initial field at the position (x, y, h) at the time point oft; where $\alpha$ and $\beta$ ($\alpha+\beta=1$) indicate the weights for the laser(t, x, y, h) and initial (t, x, y, h) for determining the magnitude. In Equation 1, x, y and h may indicate the longitude, the latitude and the height of the position. Further, in Equation 1, the values of $\alpha$ and $\beta$ may change according to the height. For example, the value of a may decrease with the increase of the height, while the value of $\beta$ may increase with the decrease of the height.

In one embodiment, a relationship between the values of $\alpha$ and $\beta$ and the height may be defined. For example, the relationship may be defined as a continuous function with the height as the independent variable. In another example, the relationship may be defined as a discrete function by a lookup table, or the relationship may be defined with another data structure. Table 1 illustrates a lookup table that describes an exemplary relationship between the values of $\alpha$ and $\beta$ and the height.

TABLE 1

| No. | Height | $\alpha$ | $\beta = 1 - \alpha$ |
|---|---|---|---|
| 1 | 0 | 1 | 0 |
| ... | ... | ... | ... |
| 20 | 2000 | 0.8 | 0.2 |
| ... | ... | ... | ... |
| 30 | 3000 | 0.5 | 0.5 |
| ... | ... | ... | ... |

Figure 5A:
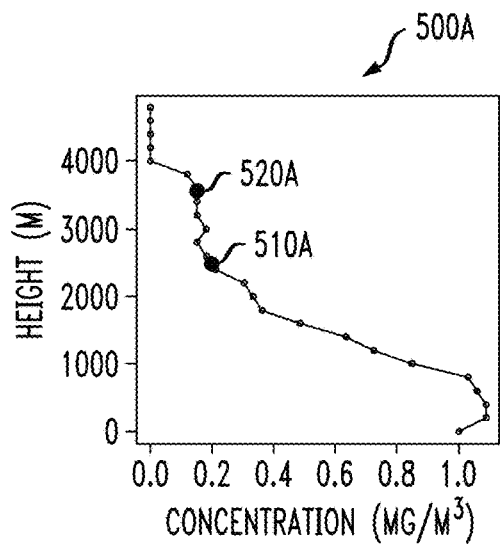
FIGS. 5A and 5B respectively illustrate example curves of the pollution concentration according to one embodiment.
Figure 5B:
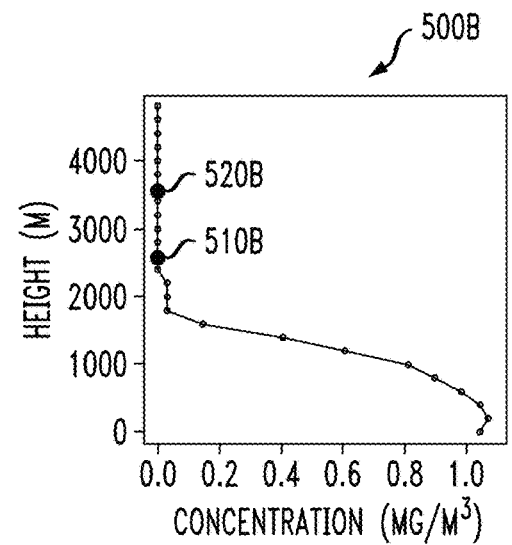

FIGS. 5A and 5B respectively illustrate example curves of the pollution concentration according to one embodiment of the present disclosure, where FIG. 5A illustrates a relationship between the heights and the concentration values determined from the laser measurement data, and FIG. 5B illustrates a relationship between the heights and the concentration values determined from the pollution concentration field. In these figures, the horizontal axis indicates the concentration value and the vertical axis indicates the height. Although the pollution concentration of the pollutant is illustrated in the unit of $mg/m^3$ (milligram per cubic meter) and the height is illustrated in the unit of meter, the pollution concentration and height may be represented using other measurement units. The curves in FIGS. 5A and 5B indicate the concentration values at the position of (X, Y), where the heights may be within a range of [0-5000] meters.

Based on Equation 1 and Table 1, the concentration value magnitude(t, X, Y, 2000) at the position of (X, Y, 2000) at a time point t may be determined according to Equation 2 as below:

$$\text{magnitude}(t, X, Y, 2000) = \qquad (2)$$
$$\alpha \cdot \text{laser}(t, X, Y, 2000) + \beta \cdot \text{initial}(t, X, Y, 2000) =$$
$$0.8 * 0.36 + 0.2 * 0.11 = 0.508$$

In Equation 2, laser(t, X, Y, 2000) indicates the concentration value obtained from the curve of FIG. 5A at a point 510A, initial(t, X, Y, 2000) indicates the concentration value obtained from the curve of FIG. 5B at a point 510B, and the values of $\alpha$ and $\beta$ are determined from Table 1.

In another example, the concentration value magnitude(t, X, Y, 3000) at the position of (X, Y, 3000) at a time point t may be determined according to Equation 3 as below:

$$\text{magnitude}(t, X, Y, 3000) = \\ \alpha \cdot \text{laser}(t, X, Y, 3000) + \beta \cdot \text{initial}(t, X, Y, 3000) = \\ 0.5 * 0.2 + 0.5 * 0 = 0.1 \qquad 3$$

In Equation 3, laser(t, X, Y, 3000) indicates the concentration value obtained from the curve of FIG. 5A at a point 520A, initial(t, X, Y, 3000) indicates the concentration value obtained from the curve of FIG. 5B at a point 520B, and the values of α and β are determined from Table 1. Based on the above examples in Equations 2 and 3, those skilled in the art may determine the concentration value at another position within the geographic area.

In one embodiment of the present disclosure, in determining the concentration value for a position that is not deployed with a sensor, the measurement data may also be considered. For example, a further weight may be given to the value of α according to the distant between the position and the position of the nearest laser sensor. In another embodiment, the measurement data from multiple laser sensors may be used in determining the concentration value for a position within the geographic area.

An area with higher values may indicate a relative serious pollution, and an area with lower values may indicate that the air quality is relative fine compared with the area with higher values. Accordingly, the pollution concentration field may be analyzed to find a variation tendency, then the at least one target area may be determined from the variation tendency.

In one embodiment, the pollution concentration field may comprise the concentration values at various time points within a time duration (e.g., four months). At this point, the concentration values at the various time points within the time duration may be used to determine a representative target area within the geographic area. In one example, the target area may be a serious pollution area in the city. The pollution may change as the season changes, and then the pollution situation at various time points in a year may be used.

In one embodiment, the time series data associated with concentration values for a time duration may be obtained from the pollution concentration field; and then the at least one target area may be determined by identifying a variation tendency from the time series data. In this embodiment, the time series data may be used in various manners. For example, the concentration values for various months may be merged to determine an average pollution state within the time duration, and then the average pollution state may be analyzed to identify the variation tendency in the average pollution state. As another example, the concentration values for each month may be analyzed to find the variation tendency for each month, and then the variation tendencies may be further processed to obtain the final variation tendency.

According to the purpose of the pollution monitoring, the target area may be defined in various manners. For example, the target area may be defined as a serious pollution point in the context of monitoring pollution sources, such as chimneys in factories. Additionally, the target area may be defined as a serious pollution area in the context of monitoring the pollution situation of an area.

In one embodiment, respective variation gradients at respective points associated with the time series data may be determined, and the at least one pollution point may be determined based on the respective variant gradients. The pollution concentration field describes pollution levels of a continuous volume space within the geographic area and the variation gradients at respective points within the volume may reflect the rate of changes in the concentration values. Thus, a point with a high variation gradient may indicate that a pollution source, such as a chimney, may be near the point, and the point may be identified as a pollution point.

Various methods may be adopted to describe the pollution concentration field and the time series data. Further, various algorithms may be used to determine the variation gradients. In one example, sample points may be selected within the geographic area according to a rule (e.g., at an interval of 10 meters). Next, the variation gradients associated with the selected sample points may be ranked and top ones may be identified as the pollution points.

Figure 6:
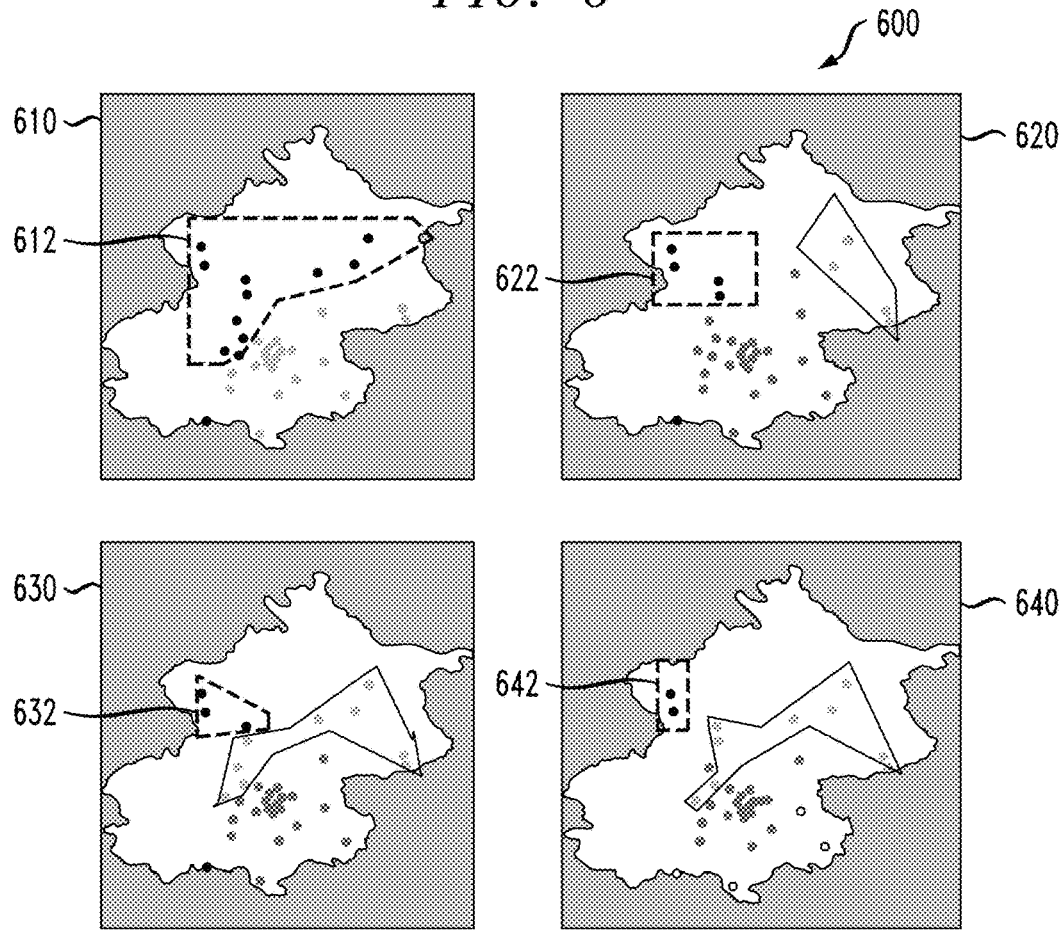
FIG. 6 schematically illustrates example pollution points determined from the concentration values for different time periods according to one embodiment.

FIG. 6 schematically illustrates example pollution points determined from the concentration values for different time periods according to one embodiment of the present disclosure. As the pollution concentration field may comprise concentration values for a time period (e.g., January, February, March and April), the pollution points may be identified based on the time series data that is associated with each month. In FIG. 6, the diagrams 610, 620, 630, and 640 respectively illustrate the pollution points identified according to the pollution data for January, February, March and April.

In FIG. 6, the points in the areas 612, 622, 632 and 642 (as shown by the dashed lines) are identified serious pollution points for the four months. It is seen that the distributions of the pollution points are not the same for the four months. The final pollution points may be determined by combining the four areas. In one embodiment, the final pollution points may be determined by determining an intersection among the points in the areas 612, 622, 632 and 642. In another embodiment, the final pollution points may be determining based on the positions of the points in the four areas. For example, the points in the four areas may be aggregated into various categories, and the center point of the category may be identified as the final pollution points. In yet another embodiment, the target area may be a serious pollution area and may be determined according to an intersection of the areas 612, 622, 632 and 642. In still another embodiment, the target area may be determined according to other procedures.

In some embodiments of the present disclosure, the time series data may be aggregated into at least one category based on a variation tendency of concentration values in the time series data; and the at least one pollution area may be determined based on the at least one category.

As described in the above, the concentration values at each point within the geographic area may be described by time series data, where the time series data associated with each point may indicate the pollution degree at each point as the time changes. Then, aggregating algorithms may be applied to the time series data to find the points with similar patterns in concentration values. For example, the time series data for points in the geographic area may be aggregated into various categories and the points associated with each category may form a candidate area because the pollution degrees within the candidate area are similar.

Figure 7:
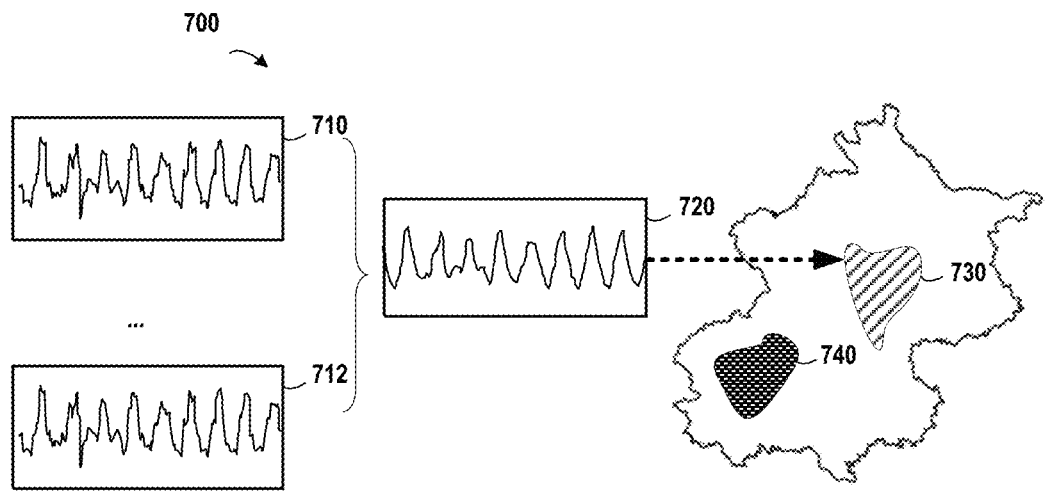
FIG. 7 schematically illustrates an example diagram block for determining a pollution area by aggregating according to one embodiment.

FIG. 7 schematically illustrates an example diagram 700 for determining a pollution area by aggregating, according to an embodiment. In FIG. 7, time series data 710, . . . , 712 indicate the concentration values for each point within the city. During the aggregating procedure, the time series data 710, . . . , 712 may be aggregated into a category with a pattern 720. Based on the magnitudes of the pollution concentration in the time series data, the category may be labeled as "serious," "medium," or "low." At this point, the points that are aggregated as "serious" may form a serious area and then may be identified as a target area. The points that are associated with the pattern 720 may have high pollution degree and thus be labeled as a serious pollution area 730. Although FIG. 7 illustrates only one category with the pattern 720, the multiple points in the city may be aggregated into multiple categories, and another area such as the area 740 may be identified as another target area.

A sensor cannot be deployed arbitrarily at any position within the geographic area. For example, some areas such, as a lake area or private land, may not allow for the deployment of a sensor. In one embodiment, a plurality of sites may be predefined and the sensor may be deployed to a target site that is selected from the plurality of sites. The influence of the pollution sources may be considered in selecting the target site.

In one embodiment, an influence of the pollution sources on the plurality of sites may be obtained, and the at least one candidate site may be selected based on the influence. The influence may comprise multiple factors, which may include, for example, the pollution sources of the site, whether there is a pollution source near the site, the distance to the pollution source, and the like.

In one embodiment, with respect to a given site of the plurality of sites, a contribution of the pollution sources to types of the plurality of sites may be obtained, and then an influence of the pollution sources on the given site may be determined based on a type of the given site and the contribution. The site may be classified into various types according to the pollution sources of the site, and then the contribution of the pollution sources (such as the pollution sources) may be determined.

Figure 8:
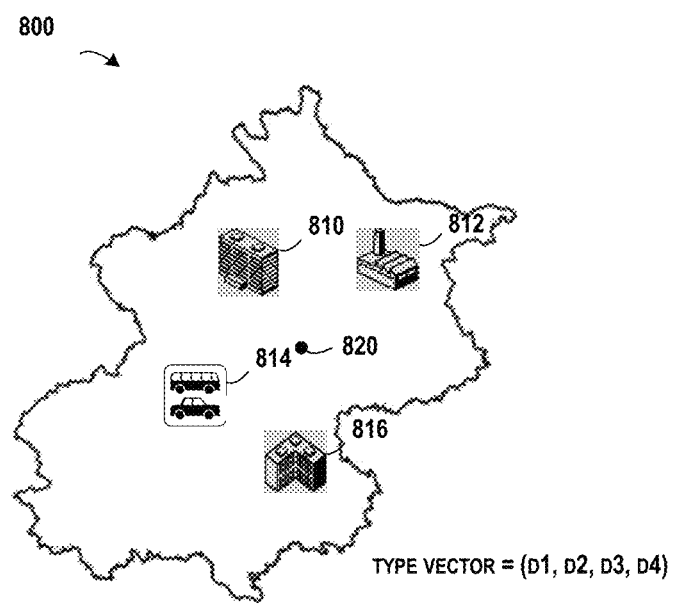
FIG. 8 schematically illustrates an example diagram block for determining a type of a candidate site according to one embodiment.

FIG. 8 schematically illustrates an example diagram 800 for determining a type of a candidate site according to an embodiment. As illustrated in FIG. 8, there may be several pollution sources around the candidate site 820. The type of the site 820 may be determined based on the types of the pollution sources around the site 820. In FIG. 8, the reference numbers 810, 812, 814 and 816 indicate a residential area, a factory, a traffic hub, and a business area, respectively. In one embodiment, the site 820 may be classified into a type of a nearest pollution source. For example, since the site 820 is located near the traffic hub 814, it may be classified as "traffic hub." In another embodiment, the type of the site may be represented by a vector, and the value at each dimension of the vector may be indicated by a distance between the site and the pollution source. With respect to the vector (D1, D2, D3, D4) illustrated in FIG. 8, the dimensions of D1-D4 in the vector may be determined according to the distances of the site 820 and the four pollution sources.

As illustrated in FIG. 8, the distance from the site to the pollution sources may be considered. If the distances to all the four pollution sources 810, 812, 814, and 816 are 1 km, then the type vector may be defined as (1, 1, 1, 1). In this example, the value in each dimension may be in an inverse proportion to the pollution source. That is, the closer the pollution source is to the site 820, the greater the value for the pollution source is in its corresponding vector dimension. Additionally, the value for a type of pollution source may be affected by the number of pollution sources of that type. For example, although only one factory 812 is illustrated in FIG. 8, if there are multiple factories, the value for the "factory" dimension may be increased. The details for determining the specific value may be predefined according to the specific environment for implementing the embodiment. In one embodiment, the vector may be normalized for simplifying the further processing.

In one embodiment, the type of each site may be described by a vector, and the contribution may be described by a matrix. Further, a production of the vector and the matrix may be determined as the influence of the pollution sources on each site. In this embodiment, the contribution of the pollution sources to the site may be expressed by a contribution matrix. An illustrative contribution matrix is depicted below in Table 2.

TABLE 2

| Contribution Matrix | | | | |
|---|---|---|---|---|
| | Source | | | |
| Type | Residential area | Factory | Business area | Traffic hub |
| Residential area | m11 | m12 | m13 | m14 |
| Factory | m21 | m22 | m23 | m24 |
| Business area | m31 | m32 | m33 | m34 |
| Traffic hub | m41 | m42 | m43 | m44 |

In the contribution matrix of Table 2, the first column indicates the type of the site and the first row indicates the type of the pollution source. For example, the value "m12" in the contribution matrix of Table 2 indicates the influence of a factory on a residential area. Continuing the above example, based on the type of the site "vector (d1, d2, d3, d4)" and the contribution matrix of Table 2, the influence of the pollution sources on the site may be determined according to Equation 4 as below:

$$\text{influence} = (d1, d2, d3, d4) \cdot \begin{pmatrix} m11 & \ldots & m14 \\ \vdots & \ddots & \vdots \\ m41 & \ldots & m44 \end{pmatrix} \qquad 4$$

Thus, according to Equation 4, the influence of the pollution sources on the site may be calculated as a product of the vector and the matrix. In this implementation, the type of the site may be represented as vector D, the contribution matrix may be represented as matrix M and, the influence may be represented as D·M. Although the above contribution matrix of Table 2 illustrates only four types of pollution sources, the number of types of pollution sources should not be considered limiting. In another embodiment, the factory may also include a chemistry factory, a medicine factory and so on, with each different factory having a different influence on the site.

Using the above Equation 4, an influence may be determined for each of the plurality of sites that are candidates for deploying the sensors. Then, these sites may be ranked according to the respective influences and the top ones may be selected from the plurality of candidate sites. In one example, the top ten sites may be selected.

The target areas such as the serious pollution points and areas may be determined according to the methods described with reference to FIGS. 6 and 7, and the sites at which the sensors may be deployed may be selected according to the methods described with reference to FIG. 8. A target site may be selected from the sites to cover the target areas. In one embodiment, the target site may be selected from the at least one selected site such that measurement of a sensor being deployed at the target site covers one or more from the at least one target area.

Figure 9:
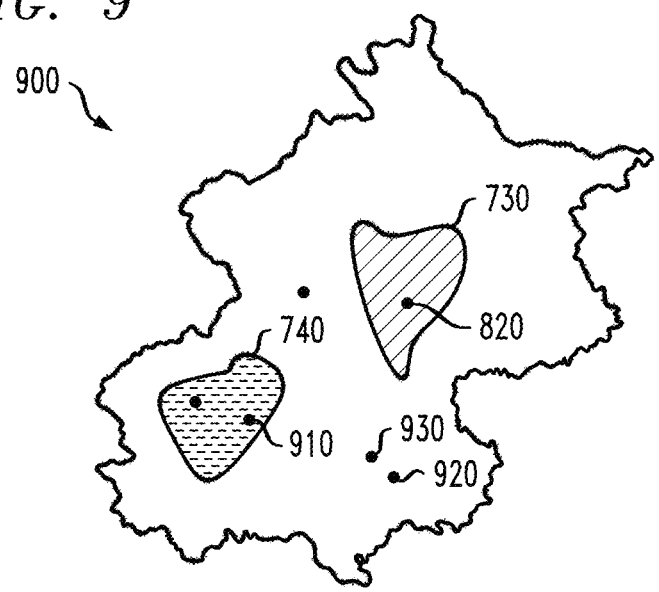
FIG. 9 schematically illustrates an example diagram block for determining a target site for deploying a sensor according to one embodiment.

FIG. 9 schematically illustrates an example diagram 900 for determining a target site for deploying a sensor according to one embodiment of the present disclosure. In FIG. 9, the target area 730 from FIG. 7 is a serious pollution area that is to be monitored, and the site 820 from FIG. 8 is a candidate site selected according to the rank of the influences. Since the site 820 is within the target area 730, the site 820 may be selected, and a sensor may be deployed at the site 820. Similarly, the target area 740 of FIG. 7 is a serious pollution area that is to be monitored, and the site 910 is a candidate site selected according to the rank of the influences. As the site 910 is just within the target area 740, the site 910 may be selected and then another sensor may be deployed. In another example, the target area 930 is a serious pollution point determined according to the present disclosure, and the site 920 is a candidate site selected according to the rank of the influences. Since the site 920 is the closest on to the target area 930, the site 920 may be selected and then a sensor may be deployed. In the example of FIG. 9, three sites 820, 910 and 920 are selected and the sensors may be deployed at the selected target sites.

Figure 10:
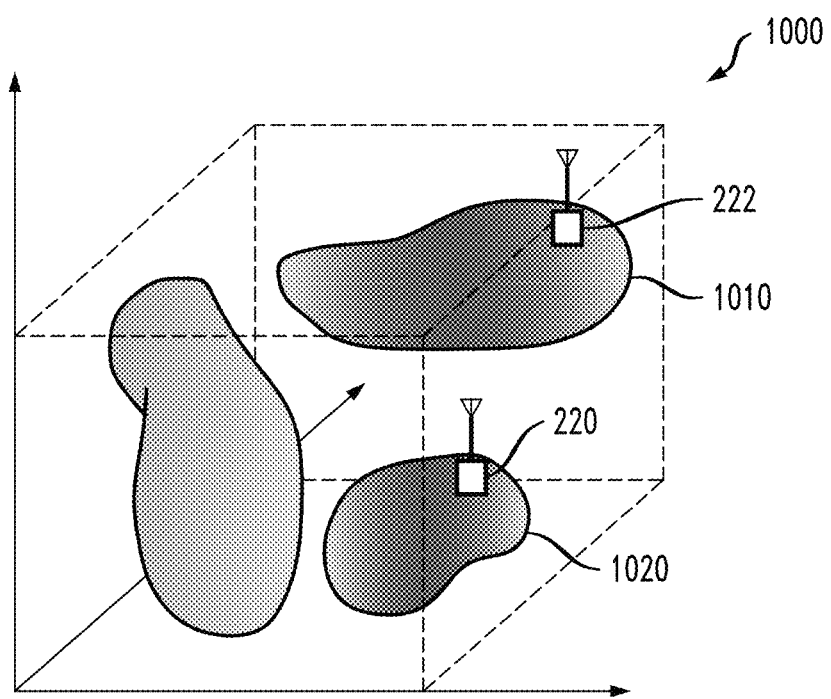
FIG. 10 schematically illustrates an example diagram block of sensors deployed at target sites determined according to one embodiment.

FIG. 10 schematically illustrates an example diagram 100 of sensors deployed at target sites determined according to one embodiment of the present disclosure. In FIG. 10, the volumes 1010 and 1020 are target areas in a 3D view, and the sensors 220 and 222 may be deployed at the selected target sites. In the 3D view, it can be seen that the sensors 220 and 222 are not deployed on the ground. Rather, the sensors 220 and 222 may be located at any place aboveground and suitable for deployment, such as the top of a building, the top of a TV tower, etc.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 11:
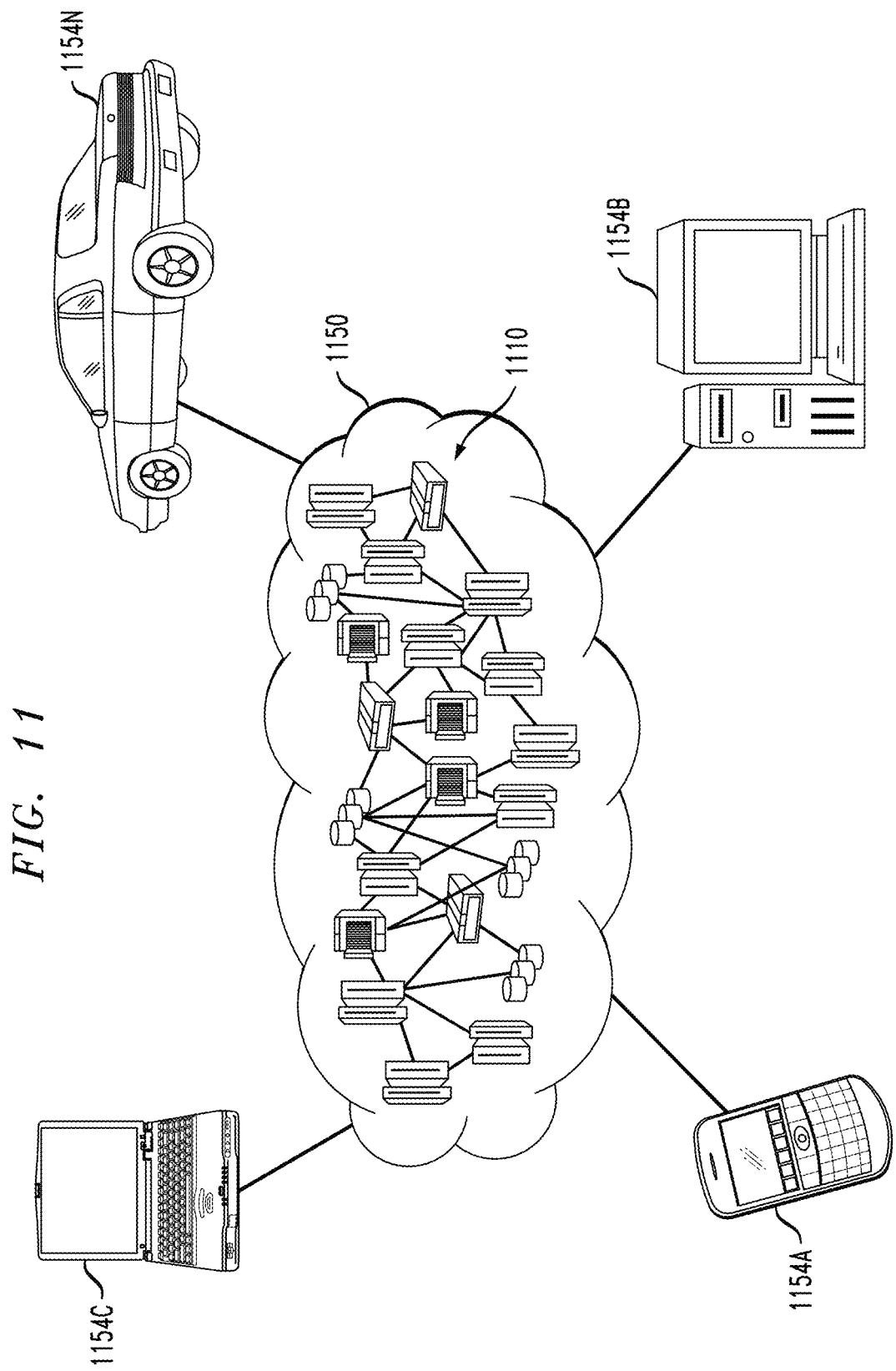
FIG. 11 depicts a cloud computing environment according to one or more embodiments.

Referring now to FIG. 11, illustrative cloud computing environment 1150 is depicted. As shown, cloud computing environment 1150 comprises one or more cloud computing nodes 1110 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1110 and cloud computing environment 1150 can communicate with any type of computerized device over any type of network and/or network addressable connection (e.g., using a web browser).

Figure 12:
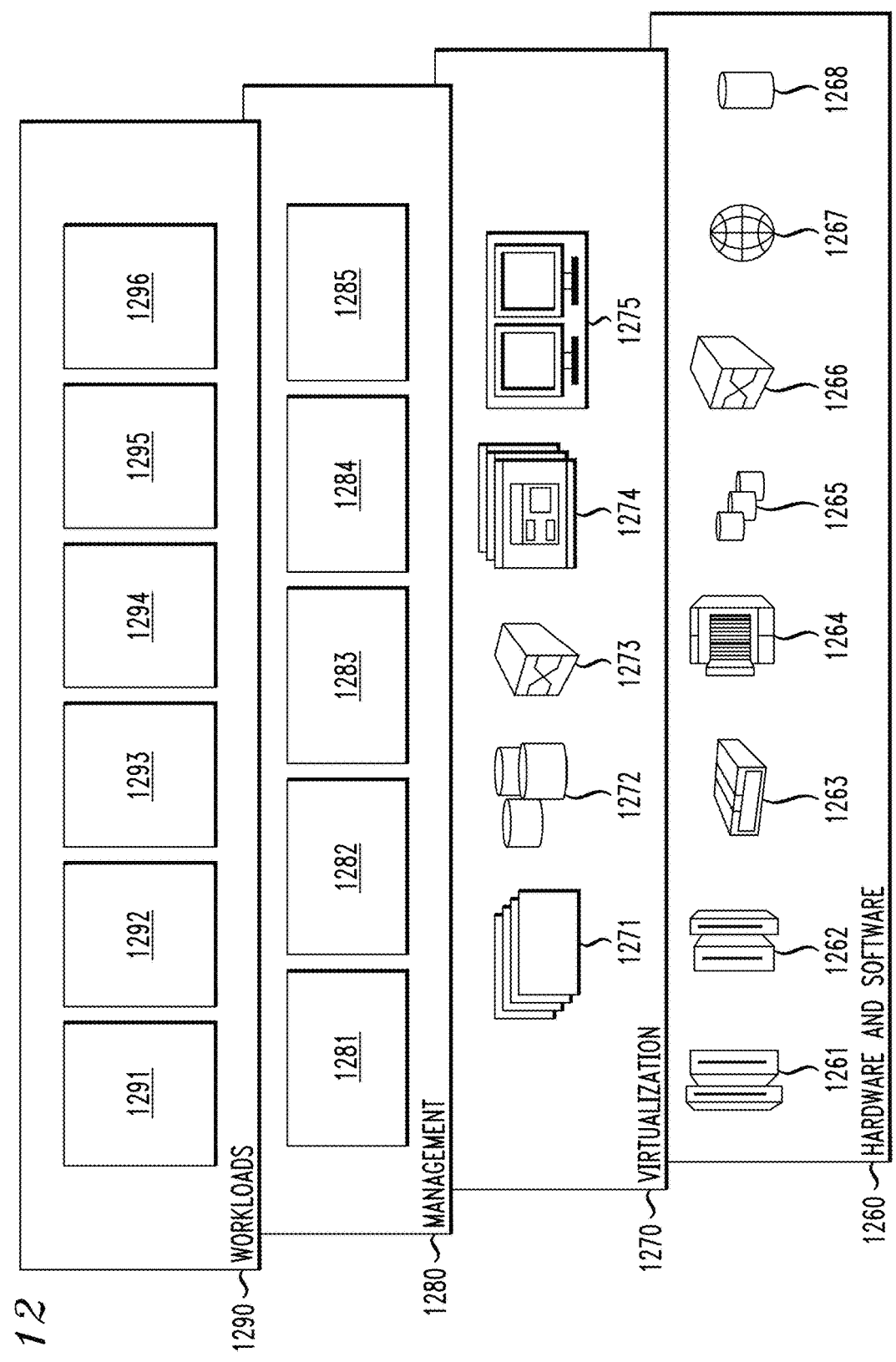
FIG. 12 depicts abstraction model layers according to one or more embodiments.

Referring now to FIG. 12, a set of functional abstraction layers provided by cloud computing environment 1150 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Examples of workloads and functions which may be provided from this layer include: mapping and navigation 1291; software development and lifecycle management 1292; data capturing 1293; data analytics processing 1294; transaction processing 1295; and sensor deployment processing 1296, which may perform one or more of the functions described above.

In some embodiments, a system comprising at least one processing device comprising a processor coupled to a memory is provided. The at least one processing device is configured to identify at least one target area based on a pollution concentration field of a geographic area. At least one candidate site is selected from a plurality of sites within the geographic area based on a relationship between the plurality of sites and pollution sources, where the plurality of sites are potential positions for deploying sensors for monitoring pollution. A target site is determined from the at least one candidate site based on the at least one target area.

In some embodiments, the at least one processing device is further configured to create the pollution concentration. During the creation of the pollution concentration, an initial field may be obtained from an air quality model of the geographic area, and the pollution concentration field may be determined by correcting the initial field with measurement data. The measurement data may be collected by at least one sensor located within the geographic area.

In some embodiments, with respect to one of the at least one sensor, measurement data collected by the sensor may be converted into a sequence of concentration values associated with height values. A magnitude at a point associated with a position of the sensor may be generated by combining values associated with the position in the initial field and the sequence of the concentration values, and the initial field may be updated with the generated magnitudes.

In some embodiments, time series data associated with concentration values for a time duration may be obtained from the pollution concentration field, and the at least one target area be determined by identifying a variation tendency from the time series data.

In some embodiments, the at least one target area includes at least one pollution point, and respective variation gradients at respective points associated with the time series data may be determined. The at least one pollution point may be determined based on the respective variant gradients.

In some embodiments, the at least one target area includes at least one pollution area, and the time series data may be aggregated into at least one category based on a variation tendency of concentration values in the time series data. Further, the at least one pollution area may be determined based on the at least one category.

In some embodiments, an influence of the pollution sources on the plurality of sites may be obtained, and the at least one candidate site may be selected based on the influence.

In some embodiments, with respect to a given site of the plurality of sites, a contribution of the pollution sources to types of the plurality of sites may be obtained. An influence of the pollution sources on the given site may be determined based on a type of the given site and the contribution.

In some embodiments, the type of the given site may be described by a vector, the contribution may be described by a matrix, and the influence of the pollution sources on the given site may be calculated as a product of the vector and the matrix.

In some embodiments, the target site may be selected from the at least one selected site such that measurement of a sensor to be deployed at the target site covers one or more from the at least one target area.

In some embodiments, a computer program product being tangibly stored on a non-transient machine-readable medium is provided. The computer program product comprises machine-executable instructions, the instructions, when executed on an electronic device, causing the electronic device to: identify at least one target area based on a pollution concentration field of a geography area; select at least one candidate site from a plurality of sites within the geography area based on a relationship between the plurality of sites and pollution sources, the plurality of sites being potential positions for deploying sensors for monitoring pollution; and determine a target site from the at least one candidate site based on the at least one target area.

In some embodiments, the instructions further cause the electronic device to: obtain an initial field from an air quality model of the geography area; and determine the pollution concentration field by correcting the initial field with measurement data, the measurement data being collected by at least one sensor located within the geography area.

In some embodiments, the instructions further cause the electronic device to: with respect to one of the at least one sensor, convert measurement data collected by the sensor into a sequence of concentration values associated with height values; generate a magnitude at a point associated with a position of the sensor by combining values associated with the position in the initial field and the sequence of the concentration values; and update the initial field with the generated magnitudes.

In some embodiments, the instructions further cause the electronic device to: obtain time series data associated with concentration values for a time duration from the pollution concentration field; and determine the at least one target area by identifying a variation tendency from the time series data.

In some embodiments, the at least one target area includes at least one pollution point. The instructions further cause the electronic device to: determine respective variation gradients at respective points associated with the time series data; and determine the at least one pollution point based on the respective variant gradients.

In some embodiments, the at least one target area includes at least one pollution area. The instructions further cause the electronic device to: aggregate the time series data into at least one category based on a variation tendency of concentration values in the time series data; and determine the at least one pollution area based on the at least one category.

In some embodiments, the instructions further cause the electronic device to: obtain an influence of the pollution sources on the plurality of sites; and select the at least one candidate site based on the influence.

In some embodiments, the instructions further cause the electronic device to: with respect to a given site of the plurality of sites, obtain a contribution of the pollution sources to types of the plurality of sites; and determine an influence of the pollution sources on the given site based on a type of the given site and the contribution.

In some embodiments, the type of the given site is described by a vector, and the contribution is described by a matrix. The instructions further cause the electronic device to: determine a production of the vector and the matrix as the influence of the pollution sources on the given site.

In some embodiments, the instructions further cause the electronic device to: select the target site from the at least one selected site such that measurement of a sensor to be deployed at the target site covers one or more from the at least one target area.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A computer-implemented method, comprising:
   obtaining, by at least one processing device comprising a processor operatively coupled to a memory, a list of candidate sites within a geographic area that are potential locations for deploying additional sensors for monitoring pollution;
   obtaining, by the at least one processing device, a list of pollution source sites within the geographic area that are generating pollution, the list of pollution source sites comprising a location of each pollution source site within the geographic area;
   obtaining, by the at least one processing device, a pollution concentration field of the geographic area, the pollution concentration field comprising a three-dimensional model describing distributions of pollutants within the geographic area;
   obtaining, by the at least one processing device, real-time sensor data from a plurality of sensors located at a plurality of locations within the geographic area, the real-time sensor data being generated in real-time by each sensor of the plurality of sensors based at least in part on pollution in the geographic area that is within range of the location of that sensor;
   updating, by the at least one processing device, the pollution concentration field based at least in part on the real-time sensor data, the updating comprising:
     converting the real-time sensor data obtained from each sensor into a sequence of pollution concentration values and corresponding height values, the corresponding height value for each pollution concentration value being relative to the location of each sensor;
     generating a magnitude for each location associated with each corresponding sensor by combining the pollution concentration value associated with that location in the pollution concentration field and the pollution concentration value associated with that location in the sequence, the combining comprising weighting each of the pollution concentration value associated with that location in the pollution concentration field and the pollution concentration value associated with that location in the sequence based at least in part on the corresponding height value for that location; and
     updating the pollution concentration field based at least in part on the generated magnitude for each location to generate the updated pollution concentration field;
   identifying, by the at least one processing device, a target area within the geographic area based at least in part on the updated pollution concentration field;
   determining, by the at least one processing device, a contribution of each of the pollution source sites to at least one type of pollution at each of the candidate sites in the target area;
   determining, by the at least one processing device, a combined pollution influence value of the pollution source sites on each of the candidate sites in the target area based at least in part on the updated pollution concentration field and the determined contribution of each of the pollution source sites to the at least one type of pollution at each respective candidate site;

ranking, by the at least one processing device, the candidate sites based at least in part on the combined pollution influence value;

selecting, by the at least one processing device, a target site from the candidate sites in the target area based at least in part on the ranking of the candidate sites, the target site comprising a top candidate site in the ranking; and causing, by the at least one processing device, a deployment of one or more additional sensors at the target site based at least in part on the selection of the target site from the candidate sites in the target area;

wherein the target site comprises a three-dimensional volume within the three-dimensional model of the updated pollution concentration field; and wherein causing the deployment of the one or more additional sensors at the target site comprises selecting respective height values for each of the one or more additional sensors that fall within the three-dimensional volume of the target site, at least one of the one or more additional sensors being deployed at a height value that is above a ground height value.

2. The method of claim 1, wherein determining a contribution of each of the pollution source sites to at least one type of pollution at each of the candidate sites in the target area comprises obtaining, for a given candidate site of the candidate sites in the target area, a contribution of the pollution source sites to a type of the given candidate site;

wherein determining the pollution influence of each of the pollution source sites on each of the candidate sites in the target area comprises determining the pollution influence of the pollution source sites on the given candidate site based at least in part on the type of the given candidate site and the obtained contribution;

wherein the type of the given candidate site of the candidate sites in the target area is described by a vector, the contribution is described by a matrix, and determining the pollution influence of the pollution source sites on the given candidate site further comprises determining a product of the vector and the matrix as the pollution influence of the pollution source sites on the given candidate site.

3. The method of claim 1, wherein selecting the target site further comprises selecting the target site from the candidate sites in the target area such that measurement of a sensor to be deployed at the target site provides sensor coverage for one or more of the candidate sites in the target area.

4. The method of claim 1, wherein identifying the target area further comprises:
obtaining time series data associated with concentration values for a time duration from the updated pollution concentration field; and
determining the target area by identifying a variation tendency from the time series data; and wherein the target area includes at least one pollution point, and identifying the target area further comprises:
determining, via one or more algorithms, respective variation gradients of one or more pollutants at respective points associated with the time series data; and
determining the at least one pollution point based on the respective variant gradients.

5. The method of claim 4, wherein the target area includes at least one pollution area, and identifying the target area further comprises:
aggregating the time series data into at least one category based on a variation tendency of concentration values in the time series data; and
determining the at least one pollution area based on the at least one category.

6. The method of claim 4, wherein the algorithm is configured to identify multiple pollutant points and provide a ranking of at least some of the pollutant points.

7. The method of claim 1, wherein the one or more additional sensors comprise at least one laser sensor configured to determine a reflectivity of air.

8. The method of claim 1, wherein the weighting of a given one of the pollution concentration values associated with a given location in the pollution concentration field is further based at least in part on a distance of the given location with respect to a nearest one of the plurality of sensors.

9. The method of claim 1, wherein the weighting of a given one of the pollution concentration values associated with a given location in the pollution concentration field is further based at least in part on a distance of the given location with respect to two or more nearest ones of the plurality of sensors.

10. The method of claim 1, wherein obtaining the real-time sensor data comprises emitting one or more laser beams from respective ones of the plurality of sensors and collecting corresponding reflection signals as measurement data.

11. A system comprising:
at least one processing device comprising a processor coupled to a memory;
wherein the at least one processing device is configured to:
obtain a list of candidate sites within a geographic area that are potential locations for deploying additional sensors for monitoring pollution;
obtain a list of pollution source sites within the geographic area that are generating pollution, the list of pollution source sites comprising a location of each pollution source site within the geographic area;
obtain a pollution concentration field of the geographic area, the pollution concentration field comprising a three-dimensional model describing distributions of pollutants within the geographic area;
obtain real-time sensor data from a plurality of sensors located at a plurality of locations within the geographic area, the real-time sensor data being generated in real-time by each sensor of the plurality of sensors based at least in part on pollution in the geographic area that is within range of the location of that sensor;
update the pollution concentration field based at least in part on the real-time sensor data, the updating comprising:
converting the real-time sensor data obtained from each sensor into a sequence of pollution concentration values and corresponding height values, the corresponding height value for each pollution concentration value being relative to the location of each sensor;
generating a magnitude for each location associated with each corresponding sensor by combining the pollution concentration value associated with that location in the pollution concentration field and the pollution concentration value associated with that location in the sequence, the combining comprising weighting each of the pollution concentration value associated with that location in the pollution concentration field and the pollution concentration value associated with that location in the sequence based at least in part on the corresponding height value for that location; and updating the pollution concentration field based at least in part on the generated magnitude for each location to generate the updated pollution concentration field;

identify a target area within the geographic area based at least in part on the pollution concentration field;

determine a contribution of each of the pollution source sites to at least one type of pollution at each of the candidate sites in the target area;

determine a combined pollution influence value of the pollution source sites on each of the candidate sites in the target area based at least in part on the updated pollution concentration field and the determined contribution of each of the pollution source sites to the at least one type of pollution at each respective candidate site;

rank the candidate sites based at least in part on the combined pollution influence value;

select a target site from the candidate sites in the target area based at least in part on the ranking of the candidate sites, the target site comprising a top candidate site in the ranking; and causing a deployment of one or more additional sensors at the target site based at least in part on the selection of the target site from the candidate sites in the target area;

wherein the target site comprises a three-dimensional volume within the three-dimensional model of the updated pollution concentration field; and wherein causing the deployment of the one or more additional sensors at the target site comprises selecting respective height values for each of the one or more additional sensors that fall within the three-dimensional volume of the target site, at least one of the one or more additional sensors being deployed at a height value that is above a ground height value.

12. The system of claim 11, wherein, in selecting the target site, the at least one processing device is further configured to select the target site from the candidate sites in the target area such that measurement of a sensor to be deployed at the target site provides sensor coverage for one or more of the candidate sites.

13. The system of claim 11,
wherein determining a contribution of each of the pollution source sites to at least one type of pollution at each of the candidate sites in the target area comprises obtaining, for a given candidate site of the candidate sites in the target area, a contribution of the pollution source sites to a type of the given candidate site;

wherein determining the pollution influence of each of the pollution source sites on each of the candidate sites in the target area comprises determining the pollution influence of the pollution source sites on the given candidate site based at least in part on the type of the given candidate site and the obtained contribution;

wherein the type of the given candidate site of the candidate sites in the target area is described by a vector, the contribution is described by a matrix, and determining the pollution influence of the pollution source sites on the given candidate site further comprises determining a product of the vector and the matrix as the pollution influence of the pollution source sites on the given candidate site.

14. The system of claim 11,
wherein in identifying the target area, the at least one processing device is further configured to:
obtain time series data associated with concentration values for a time duration from the updated pollution concentration field; and
determine the target area by identifying a variation tendency from the time series data; and
wherein the target area includes at least one pollution point, and in identifying the target area the at least one processing device is further configured to:
determine, via one or more algorithms, respective variation gradients of one or more pollutants at respective points associated with the time series data; and
determine the at least one pollution point based on the respective variant gradients.

15. The system of claim 14, wherein the target area includes at least one pollution area, and in identifying the target area, the at least one processing device is further configured to:
aggregate the time series data into at least one category based on a variation tendency of concentration values in the time series data; and
determine the at least one pollution area based on the at least one category.

16. The system of claim 14, wherein the algorithm is configured to identify multiple pollutant points and provide a ranking of at least some of the pollutant points.

17. A computer program product comprising a processor-readable storage medium for storing processor-readable program code which, when executed by a processor, causes the processor to:
obtain a list of candidate sites within a geographic area that are potential locations for deploying additional sensors for monitoring pollution;
obtain a list of pollution source sites within the geographic area that are generating pollution, the list of pollution source sites comprising a location of each pollution source site within the geographic area;
obtain a pollution concentration field of the geographic area, the pollution concentration field comprising a three-dimensional model describing distributions of pollutants within the geographic area;
obtain real-time sensor data from a plurality of sensors located at a plurality of locations within the geographic area, the real-time sensor data being generated in real-time by each sensor of the plurality of sensors based at least in part on pollution in the geographic area that is within range of the location of that sensor;
update the pollution concentration field based at least in part on the real-time sensor data, the updating comprising:
converting the real-time sensor data obtained from each sensor into a sequence of pollution concentration values and corresponding height values, the corresponding height value for each pollution concentration value being relative to the location of each sensor;
generating a magnitude for each location associated with each corresponding sensor by combining the pollution concentration value associated with that location in the pollution concentration field and the pollution concentration value associated with that location in the sequence, the combining comprising weighting each of the pollution concentration value associated with that location in the pollution concentration field and the pollution concentration value associated with that location in the sequence based at least in part on the corresponding height value for that location; and updating the pollution concentration field based at least in part on the generated magnitude for each location to generate the updated pollution concentration field;

identify a target area within the geographic area based at least in part on the updated pollution concentration field;

determine a contribution of each of the pollution source sites to at least one type of pollution at each of the candidate sites in the target area;

determine a combined pollution influence value of the pollution source sites on each of the candidate sites in the target area based at least in part on the updated pollution concentration field and the determined contribution of each of the pollution source sites to the at least one type of pollution at each respective candidate site;

rank the candidate sites based at least in part on the combined pollution influence value;

select a target site from the candidate sites in the target area based at least in part on the ranking of the candidate sites, the target site comprising a top candidate site in the ranking;

cause a deployment of one or more additional sensors at the target site based at least in part on the selection of the target site from the candidate sites in the target area;

wherein the target site comprises a three-dimensional volume within the three-dimensional model of the updated pollution concentration field; and wherein causing the deployment of the one or more additional sensors at the target site comprises selecting respective height values for each of the one or more additional sensors that fall within the three-dimensional volume of the target site, at least one of the one or more additional sensors being deployed at a height value that is above a ground height value.

18. The computer program product of claim 17, wherein selecting the target site further comprises selecting the target site from the candidate sites in the target area such that measurement of a sensor to be deployed at the target site provides sensor coverage for one or more of the candidate sites in the target area.

19. The computer program product of claim 17,
wherein in identifying the target area, the processor is further configured to:
obtain time series data associated with concentration values for a time duration from the updated pollution concentration field; and
determine the target area by identifying a variation tendency from the time series data; and
wherein the target area includes at least one pollution point, and in identifying the target area, the processor is further configured to:
determine, via one or more algorithms, respective variation gradients of one or more pollutants at respective points associated with the time series data; and
determine the at least one pollution point based on the respective variant gradients.

20. The computer program product of claim 19, wherein the target area includes at least one pollution area, and, in identifying the target area, the processor is further configured to:
aggregate the time series data into at least one category based on a variation tendency of concentration values in the time series data; and
determine the at least one pollution area based on the at least one category.

* * * * *